(12) United States Patent
Sato et al.

(10) Patent No.: US 11,008,260 B2
(45) Date of Patent: May 18, 2021

(54) CORROSION RESISTANT MATERIALS

(71) Applicant: NGK SPARK PLUG CO., LTD., Nagoya (JP)

(72) Inventors: Keisuke Sato, Sendai (JP); Tomoyuki Asano, Sendai (JP)

(73) Assignee: NGK SPARK PLUG CO., LTD., Nagoya (JP)

(*) Notice: Subject to any disclaimer, the term of this patent is extended or adjusted under 35 U.S.C. 154(b) by 0 days.

(21) Appl. No.: 16/829,946

(22) Filed: Mar. 25, 2020

(65) Prior Publication Data

US 2020/0308061 A1 Oct. 1, 2020

(30) Foreign Application Priority Data

Mar. 26, 2019 (JP) .............................. JP2019-057748
Mar. 11, 2020 (JP) .............................. JP2020-042136

(51) Int. Cl.
*C04B 35/505* (2006.01)
*C04B 35/10* (2006.01)
*C04B 111/26* (2006.01)

(52) U.S. Cl.
CPC ............ *C04B 35/505* (2013.01); *C04B 35/10* (2013.01); *C04B 2111/26* (2013.01); *C04B 2235/3225* (2013.01); *C04B 2235/764* (2013.01)

(58) Field of Classification Search
CPC ...... C04B 2235/764; C04B 2235/3225; C04B 2111/26; C04B 35/10; C04B 35/505
See application file for complete search history.

(56) References Cited

U.S. PATENT DOCUMENTS

| 5,447,937 A | 9/1995 | Davies et al. |
| 6,417,127 B1* | 7/2002 | Yamamoto ............ C04B 35/115 |
| | | 501/127 |
| 2003/0049499 A1 | 3/2003 | Murakawa et al. |
| 2014/0283995 A1* | 9/2014 | Tanaka .................. C04B 35/443 |
| | | 156/345.33 |

FOREIGN PATENT DOCUMENTS

| JP | H10-236871 A | 9/1998 |
| WO | 2013/065666 A1 | 5/2013 |

* cited by examiner

*Primary Examiner* — Karl E Group
*Assistant Examiner* — Cameron K Miller
(74) *Attorney, Agent, or Firm* — Stites & Harbison, PLLC; Jeffrey A. Haeberlin; Gary N. Stewart

(57) ABSTRACT

A corrosion resistant member has a portion to be exposed to a corrosive gas. The portion to be exposed to the corrosive gas is formed of a ceramic sintered body. The mean width (Rsm) of profile elements of a surface of the ceramic sintered body is 25 μm or less, and the ratio (Rsm/Ra) of the mean width (Rsm) of the profile elements to the arithmetic mean roughness (Ra) of the surface of the ceramic sintered body is 4,000 or less.

6 Claims, 1 Drawing Sheet

CORROSION RESISTANT MATERIALS

CROSS-REFERENCE TO RELATED APPLICATION

This application claims priority from Japanese Patent Applications Nos. 2019-057748 filed on Mar. 26, 2019, and 2020-042136 filed on Mar. 11, 2020, the entire contents of which are incorporated herein by reference.

TECHNICAL FIELD

The present disclosure relates to a corrosion resistant member.

BACKGROUND ART

In conventional semiconductor manufacturing devices, when a thin film is formed on a surface of a substrate through chemical vapor deposition (CVD) or is subjected to fine patterning by etching, a plasma gas is introduced into a reaction vessel housing the substrate. A gas nozzle etc., which are members for introducing the plasma gas, are required to have high corrosion resistance to a halogen gas such as a fluoride gas, in a plasma state.

For example, Japanese Patent Application Laid-Open (kokai) No. H10-236871 discloses a technique for reducing corrosion of a surface to be exposed to a halogen-based corrosive gas. Specifically, the surface is formed of sintered yttrium aluminum garnet (YAG) having a porosity of 3% or less, and the center line average roughness (Ra) of the surface is adjusted to 1 µm or less.

PCT International Publication No. WO2013/065666 discloses a technique for improving the corrosion resistance of a gas nozzle. Specifically, the gas nozzle is formed of, for example, sintered yttria or sintered spinel, and the mean width (Rsm) of profile elements of one end face on which gas discharge holes are formed is tuned to be equal to or more than five times the average crystal grain size of the sintered body.

However, even when the technique disclosed in Japanese Patent Application Laid-Open No. H10-236871 or PCT International Publication No. WO2013/065666 is employed, the corrosion resistance is unsatisfactory, and the service life of a relevant corrosion resistant member is short. In particular, a local increase in surface roughness causes a reduction in service life.

The present disclosure has been made in view of the above circumstances, and an object of the present disclosure is to provide a corrosion resistant member having an extended service life.

SUMMARY

The corrosion resistant member of the present disclosure has a portion to be exposed to a corrosive gas. The portion to be exposed to the corrosive gas is formed from a ceramic sintered body. The surface of the ceramic sintered body has a mean width (Rsm) of profile elements of 25 µm or less, and the ratio (Rsm/Ra) of the mean width (Rsm) of the profile elements to an arithmetic mean roughness (Ra) of the surface of the ceramic sintered body is 4,000 or less.

In the corrosion resistant member of the present disclosure, the mean width (Rsm) of the profile elements of the surface of the ceramic sintered body is smaller than 30 µm, which is the minimum value of the mean width (Rsm) of the profile elements of a sample disclosed in PCT International Publication No. WO2013/065666. The small mean width (Rsm) of the profile elements means that the spacing between adjacent recesses is small. This can prevent rapid deterioration in the surface state, so that the service life of the corrosion resistant member can be extended.

Also, the surface of the ceramic sintered body of the corrosion resistant member has a ratio (Rsm/Ra) of the mean width (Rsm) of the profile elements to the arithmetic mean roughness (Ra) of 4,000 or less. This ensures a longer service life. Since the average size (depth) of recesses of the surface can be estimated from the arithmetic mean roughness (Ra), the degree of the increase in surface roughness can conceivably be estimated from the ratio (Rsm/Ra).

In the corrosion resistant member of the present disclosure, the arithmetic mean roughness (Ra) of the surface of the ceramic sintered body is preferably 0.02 µm or less.

In this case, a long service life can be ensured. This is because, conceivably, the average size (depth) of the recesses of the surface of the ceramic sintered body can be estimated from the arithmetic mean roughness (Ra).

In the corrosion resistant member of the present disclosure, the maximum height (Rz) of the surface of the ceramic sintered body is preferably 0.2 µm or less.

In this case, a long service life can be ensured. This is because, conceivably, the local size (depth) of the recesses of the surface of the ceramic sintered body can be estimated from the maximum height (Rz).

In the corrosion resistant member of the present disclosure, the ceramic sintered body may contain, as a predominant component, at least one species selected from alumina, yttria, and yttrium aluminum garnet.

In the corrosion resistant member of the present disclosure, the portion to be exposed to the corrosive gas may be at least a part of a gas nozzle, the part forming a nozzle hole of the gas nozzle.

In the corrosion resistant member of the present disclosure, preferably, the mean width (Rsm) of the profile elements is 5 µm or more, and the ratio (Rsm/Ra) is 250 or more.

This is because, when the mean width (Rsm) of the profile elements is less than 5 µm or the ratio (Rsm/Ra) is less than 250, the time or cost required for polishing may excessively increase.

DETAILED DESCRIPTION OF PREFERRED EMBODIMENTS

Figure 1:
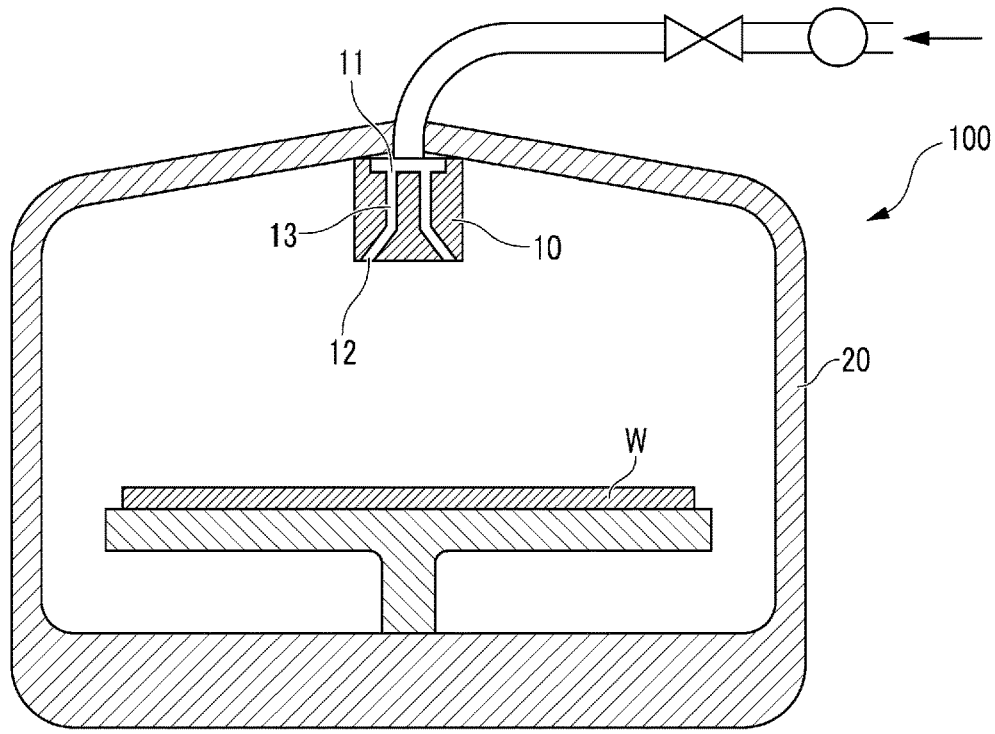
FIG. 1 is a schematic cross-sectional view showing a plasma device equipped with a gas nozzle including a corrosion resistant member according to an embodiment of the present disclosure.

A corrosion resistant member 10 according to an embodiment of the present disclosure will be described with reference to the drawings. In FIG. 1, components of the corrosion resistant member 10 are deformed in order to clarify the structure of the corrosion resistant member 10, and their dimensional ratios do not represent the actual ratios.

In the present embodiment, the corrosion resistant member 10 is a gas nozzle 10 employed in a plasma device 100 such as a film deposition device for forming a thin film on a substrate W such as a semiconductor wafer or a glass substrate, or an etching device for performing fine patterning on the substrate W, in a semiconductor production process or a liquid crystal production process.

For example, in the film deposition device, a thin film is formed on the substrate W through plasma CVD (Chemical Vapor Deposition); specifically, by introducing a raw material gas containing a corrosive gas into a reaction vessel 20 through the gas nozzle 10, and converting the raw material gas to a plasma gas. Also, in the etching device, a halogen-containing corrosive gas serving as a raw material gas is fed into the reaction vessel 20 through the gas nozzle 10, and the corrosive gas is converted to a plasma gas serving as an etching gas so as to perform fine patterning on the substrate W.

The gas nozzle 10 has a gas supply port 11 to which gas such as the corrosive gas is supplied from an unillustrated gas supply unit, gas discharge openings 12 from which the gas is injected into the reaction vessel 20, and nozzle holes 13 that connect the gas supply port 11 to the gas discharge openings 12.

Figure 2:
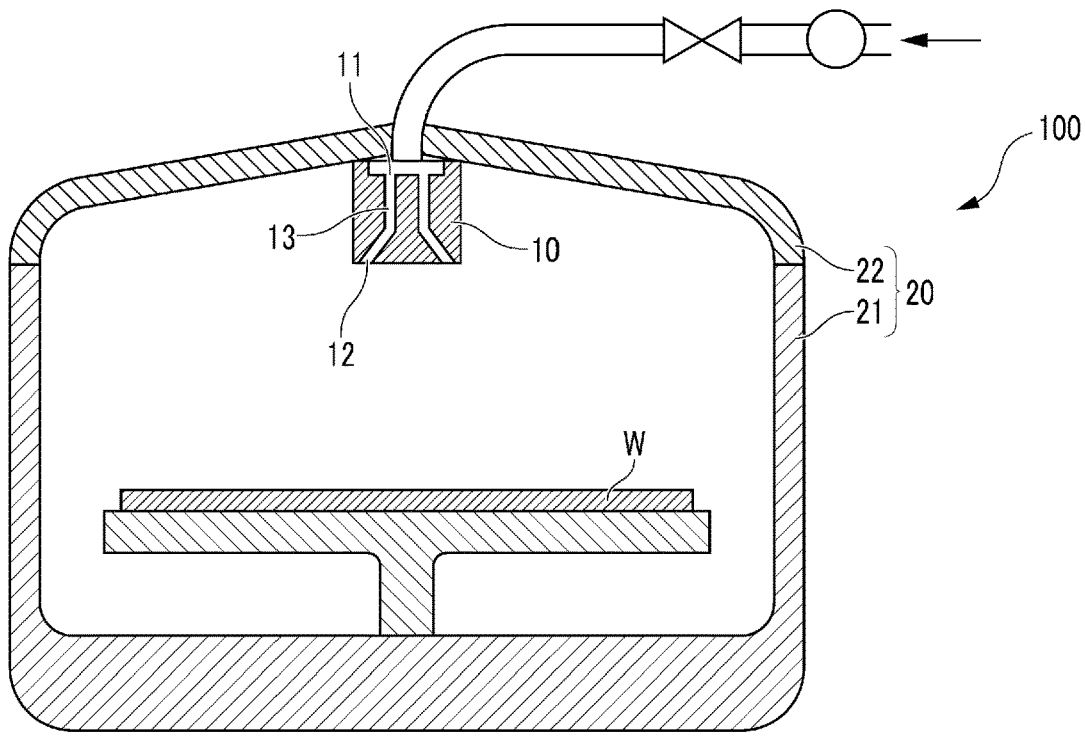
FIG. 2 is a schematic cross-sectional view showing another mode of the plasma device.

The corrosion resistant member 10 according to the present embodiment of the present disclosure is a member having a portion to be exposed to the corrosive gas. In the present embodiment, the corrosion resistant member 10 is a member that forms at least partially the portion of the gas nozzle 10 that is to be exposed to the corrosive gas, for example, at least partially a portion including the nozzle holes 13 and a portion exposed to the interior of the reaction vessel 20. The corrosion resistant member 10 may form the entirety of the gas nozzle 10. As shown in FIG. 2, in the case of a reaction vessel 20 composed of a vessel body 21 and a lid 22, the corrosion resistant member may be the lid 22 including the gas nozzle 10 or a part of the lid 22.

In the corrosion resistant member 10, at least the portion to be exposed to the corrosive gas is formed of a ceramic sintered body. The ceramic sintered body predominantly contains, for example, at least one species selected from alumina, yttria, and yttrium aluminum garnet (YAG).

The surface of the ceramic sintered body of the corrosion resistant member 10 has a mean width (Rsm) of profile elements of 25 μm or less, more preferably 15 μm or less. The mean width (Rsm) of the profile elements is smaller than 30 μm, which is the minimum value of the mean width (Rsm) of profile elements of a sample disclosed in PCT International Publication No. WO2013/065666. The small mean width (Rsm) of the profile elements means that the spacing between adjacent recesses is small. In this case, rapid deterioration in surface state is prevented, so that the service life of the corrosion resistant member 10 can be prolonged.

The mean width (Rsm) of the profile elements is preferably 5 μm or more. This is because, when the mean width (Rsm) of the profile elements is less than 5 μm, the time or cost required for polishing may excessively increase.

When the corrosive gas plasma comes into contact with the surface of the ceramic sintered body, projecting and recesses of the surface are particularly likely to be attacked and likely to serve as sources of particles. When the mean width (Rsm) of profile elements of the surface of a ceramic sintered body is large, the large mean width (Rsm) means that the spacing between adjacent recesses is large (the number of recesses is reduced). In this case, attack by plasma occurs in a concentrated manner on a small number of recesses. This may cause local deterioration in the surface state, resulting in a reduction in service life of the corrosion resistant member 10.

However, in the present disclosure, since the spacing between recesses portions present on the surface of the ceramic sintered body is small, conceivably, falling of particles from recesses due to the corrosive gas does not occur locally in a concentrated manner but occurs evenly, and this extends the service life of the corrosion resistant member 10.

On the surface of the ceramic sintered body of the corrosion resistant member 10, the ratio of the mean width (Rsm) of the profile elements to the arithmetic mean roughness (Ra), i.e., the ratio (Rsm/Ra), is 4,000 or less. This enables securement of a long service life, as can be seen from Examples and Comparative Examples described later. This is because the average size (depth) of recesses of the surface can be estimated from the arithmetic mean roughness (Ra) and therefore the degree of deterioration in surface roughness can be estimated from the ratio (Rsm/Ra). The ratio (Rsm/Ra) is preferably 250 or more. This is because, when the ratio (Rsm/Ra) is less than 250, the time or cost required for polishing may excessively increase.

The arithmetic mean roughness (Ra) of the surface of the ceramic sintered body of the corrosion resistant member 10 is preferably 0.02 μm or less, more preferably 0.01 μm or less. A large arithmetic mean roughness (Ra) is not preferred, because the size of falling pieces generated by etching with the corrosive gas plasma may increase.

Moreover, the maximum height (Rz) of the surface of the ceramic sintered body of the corrosion resistant member 10 is preferably 0.2 μm or less and more preferably 0.1 μm or less. In this case, local etching by the corrosive gas plasma can be prevented, so that a long service life can be achieved. This is because the local size (depth) of recesses of the surface can be estimated from the maximum height (Rz).

To form the surface of the ceramic sintered body of the corrosion resistant member 10 such that the mean width (Rsm) of profile elements, the ratio (Rsm/Ra), the arithmetic mean roughness (Ra), and the maximum height (Rz) fall within the above ranges, the surface is, for example, subjected to lapping, polishing, etc. using free abrasive grains prepared by mixing abrasive grains such as diamond grains with a liquid such as water or oil while the grain size of the abrasive grains, a load, the type of a lapping plate, and polishing time are adjusted.

The present disclosure is not limited to the corrosion resistant member 10 specifically described in the above embodiment and can be appropriately modified within the scope described in the claims.

The present disclosure will be described in detail by way of Examples of the present disclosure and Comparative Examples.

EXAMPLES

Examples 1 to 5

To a pot, added were yttria powder (purity: 99.9%, manufactured by Shin-Etsu Chemical Co., Ltd.) (57 wt. %), alumina powder (purity: 99.99%, manufactured by Sumitomo Chemical Co., Ltd.) (43 wt. %), a PVA-based binder serving as a binder (2 wt. %), a water-soluble acrylic acid-based dispersant serving as a dispersant (0.3 wt. %). glycerin serving as a plasticizer (0.5 wt. %), and ion exchanged water. The mixture was subjected to wet mixing using a ball mill to thereby form a slurry. Although not added in these Examples, $SiO_2$ serving as a sintering aid may be added in an amount of 0.15 wt. % to 10% wt. %.

This slurry was dried by means of a spray dryer, granulated, and subjected to cold isostatic press (CIP) molding to produce a compact. The compact was shaped into a cylindrical columnar shape, and a through hole with a diameter of 3 mm was formed along the center axis of the cylindrical columnar compact (the through hole may be formed during finish processing described later). Then, the resultant compact was debindered at 400° C. to 600° C., fired at normal pressure in an oxidizing atmosphere at 1,500° C. to 1,800° C., and then subjected to hot isostatic pressing (HIP) to obtain a YAG sintered body. The YAG sintered body was subjected to a finish processing to form a cylindrical columnar shape having a diameter of 50 mm and a height of 50 mm. The YAG sintered body was observed under a microscope, and the average grain size of the YAG sintered body was found to be 5 μm. The bulk density of the YAG sintered body was 4.5 g/cm$^3$ or more.

A circular surface of the YAG sintered body to which the gas discharge openings 12 were opened was placed on a copper-made lapping plate, polished with diamond slurry abrasive grains having a means particle size of 6 μm, placed on a tin-made lapping plate, polished with diamond slurry abrasive grains having an average particle size of 2 μm, and polished with silica abrasive grains. In each lapping or polishing process, the surface was polished under a load for 1 hour or longer.

The arithmetic mean roughness (Ra), the mean width (Rsm) of profile elements, and the maximum height (Rz) of the polished surface were measured. The measurement was performed according to JIS B 0601:2001 using a contact-type surface roughness meter SV-C4100 manufactured by Mitutoyo Corporation. Specifically, the measurement was performed under the conditions including a measurement rate of 0.20 mm/s, a measurement length of 0.4 mm, and a cutoff wavelength of 0.08 mm.

In each Example, a circular sector extending from the center of the measurement surface and having a central angle of 120° was imaginary drawn, and the measurement was performed at a total of nine points; i.e., three points in a central portion, three points in an outer circumferential portion, and three points in an intermediate portion. The measurement results are shown in Table 1. In Table 1, each value in No. 1 is the maximum of three values on a circle having a radius of r×0.2 with its center at the center of the measurement surface, where r is the radius of the cylindrical shape. Each value in No. 2 is the maximum of three values on a circle having a radius of r×0.5 with its center at the center of the measurement surface, and each value in No. 3 is the maximum of three values on a circle having a radius of r×0.8 with its center at the center of the measurement surface. In each of Examples 1 to 5, a YAG sintered body was produced in the same manner as described above, and the measurement surface was polished in the same manner as described above.

Comparative Example 1

In Comparative Example 1, a cylindrical columnar YAG sintered body was produced in the same manner as in Examples 1 to 5. Then one of the circular surfaces of the YAG sintered body was polished such that values shown in Table 1 were obtained. The polishing conditions were modified by changing the type and particle diameter of the abrasive grains, the type of the lapping plate, the load, the polishing time, etc.

The arithmetic mean roughness (Ra), the mean width (Rsm) of profile elements, and the maximum height (Rz) of the polished surface were measured in the same manner as employed in Examples 1 to 5. Table 1 shows the results. In Comparative Examples 1 and 2, the measurement was performed only at the points corresponding to No. 2.

Comparative Example 2

In Comparative Example 2, a cylindrical columnar YAG sintered body was produced in the same manner as in Examples 1 to 5. Then one of the circular surfaces of the YAG sintered body was polished such that values shown in Table 1 were obtained. The polishing conditions were adjusted by changing the type and particle diameter of the abrasive grains, the type of the lapping plate, the load, the polishing time, etc.

The arithmetic mean roughness (Ra), the mean width (Rsm) of profile elements, and the maximum height (Rz) of the polished surface were measured in the same manner as in Examples 1 to 5. Table 1 shows the results.

TABLE 1

|  |  | Rsm (μm) | Ra (μm) | Rz (μm) | Rsm/Ra |
| --- | --- | --- | --- | --- | --- |
| Example 1 | No. 1 | 7.1 | 0.0055 | 0.04 | 1290.0 |
|  | No. 2 | 7.7 | 0.0061 | 0.04 | 1262.3 |
|  | No. 3 | 8.1 | 0.0058 | 0.04 | 1396.6 |
| Example 2 | No. 1 | 8.4 | 0.0061 | 0.05 | 1377.0 |
|  | No. 2 | 19.7 | 0.0066 | 0.07 | 2984.8 |
|  | No. 3 | 9.8 | 0.0064 | 0.05 | 1531.3 |
| Example 3 | No. 1 | 6.7 | 0.0064 | 0.04 | 1046.9 |
|  | No. 2 | 6.8 | 0.0054 | 0.04 | 1259.3 |
|  | No. 3 | 7.2 | 0.0057 | 0.04 | 1263.2 |
| Example 4 | No. 1 | 8.2 | 0.0113 | 0.08 | 725.7 |
|  | No. 2 | 7.7 | 0.0170 | 0.09 | 452.9 |
|  | No. 3 | 14.7 | 0.0163 | 0.12 | 901.8 |
| Example 5 | No. 1 | 19.1 | 0.006 | 0.09 | 3131.1 |
|  | No. 2 | 22.4 | 0.0059 | 0.08 | 3796.6 |
|  | No. 3 | 18.9 | 0.0061 | 0.09 | 3098.4 |
| Comparative Example 1 | No. 2 | 40 | 0.06 |  | 666.7 |
| Comparative Example 2 | No. 2 | 100 | 0.01 |  | 10000 |

The YAG sintered bodies of Examples 1 to 5 and Comparative Examples 1 and 2 were subjected to an etching test in CF$_4$ plasma for 10 hours using a parallel plate-type RIE (reactive ion etching) apparatus. The surface state of each of the YAG sintered bodies of Examples 1 to 5 and Comparative Examples 1 and 2 was checked. In the YAG sintered bodies of Comparative Examples 1 and 2, portions with a poor surface state were locally observed. This may be because plasma attack occurred in a concentrate manner on a small number of recesses, whereby the sintered body was locally damaged. In Examples 1 to 5, since the spacing between recesses present on the surface was small, the plasma attack did not occur locally in a concentrated manner, but the surface was evenly attacked. This may be the reason why falling off of relatively large particles was prevented, and local deterioration in surface state did not occur.

Examples 6 and 7

Sintered bodies of aluminum oxide were produced as follows. To a pot, added were alumina powder (purity 99.7%, manufactured by Showa Denko K. K.), a PVA-based binder serving as a binder (2.0 wt. %), a water-soluble acrylic acid-based dispersant serving as a dispersant (0.15 wt. %), magnesium nitrate (0.6 wt. %), glycerin serving as a plasticizer (0.5 wt. %), and ion exchanged water. The resultant mixture was subjected to wet mixing using a ball mill to thereby form a slurry.

The slurry was dried by means of a spray dryer, granulated, and subjected to cold isostatic press (CIP) molding to produce a compact. The compact was shaped into a cylindrical columnar shape, and a through hole with a diameter of 3 mm was formed along its center axis. The resultant compact was fired at normal pressure in an air atmosphere at 1,500° C. to 1,700° C. to thereby obtain an aluminum oxide sintered body. The aluminum oxide sintered body was subjected to a finish processing to form a cylindrical columnar shape with a diameter of 50 mm and a height of 50 mm. The aluminum oxide sintered body was observed under a microscope, and the average grain size of the aluminum oxide sintered body was found to be 4 μm. The bulk density of the sintered body was 3.9 g/cm³.

One of the circular surfaces of the aluminum oxide sintered body was polished in the same manner as employed in Examples 1 to 5, and the arithmetic mean roughness (Ra), the mean width (Rsm) of profile elements, and the maximum height (Rz) of the polished surface were measured. Table 2 shows the results.

TABLE 2

|  |  | Rsm (μm) | Ra (μm) | Rz (μm) | Rsm/Ra |
|---|---|---|---|---|---|
| Example 6 | No. 1 | 16.2 | 0.0120 | 0.0703 | 1346 |
|  | No. 2 | 16.8 | 0.0139 | 0.0794 | 1212 |
|  | No. 3 | 16.5 | 0.0113 | 0.0684 | 1464 |
| Example 7 | No. 1 | 17.0 | 0.0126 | 0.0721 | 1355 |
|  | No. 2 | 14.7 | 0.0118 | 0.0710 | 1252 |
|  | No. 3 | 18.2 | 0.0130 | 0.0956 | 1400 |

Examples 8 and 9

Sintered bodies of yttrium oxide were produced as follows. To a pot, added were yttria powder (purity: 99.9%, manufactured by Shin-Etsu Chemical Co., Ltd.), a PVA-based binder serving as a binder (2.0 wt. %), a water-soluble acrylic acid-based dispersant serving as a dispersant (0.2 wt. %), glycerin serving as a plasticizer (0.5 wt. %), and ion exchanged water, and the mixture was subjected to wet mixing using a ball mill to form a slurry.

The slurry was dried by means of a spray dryer, granulated, and subjected to cold isostatic press (CIP) molding to produce a compact. The compact was shaped into a cylindrical columnar shape, and a through hole with a diameter of 3 mm was formed along its center axis. The resultant compact was fired at normal pressure in an oxidizing atmosphere at 1,600° C. to 1,800° C. to thereby obtain an yttrium oxide sintered body. The yttrium oxide sintered body was subjected to finish processing to form a cylindrical columnar shape having a diameter of 50 mm and a height of 50 mm. The yttrium oxide sintered body was observed under a microscope, and the average grain size of the yttrium oxide sintered body was found to be 4 μm. The bulk density of the sintered body was 5.0 g/cm³.

One of the circular surfaces of the yttrium oxide sintered body was polished in the same manner as employed in Examples 1 to 5, and the arithmetic mean roughness (Ra), the mean width (Rsm) of profile elements, and the maximum height (Rz) of the polished surface were measured. Table 3 shows the results.

TABLE 3

|  |  | Rsm (μm) | Ra (μm) | Rz (μm) | Rsm/Ra |
|---|---|---|---|---|---|
| Example 8 | No. 1 | 19.0 | 0.0056 | 0.0102 | 3393 |
|  | No. 2 | 9.2 | 0.0049 | 0.0570 | 1878 |
|  | No. 3 | 10.4 | 0.0050 | 0.0505 | 2080 |
| Example 9 | No. 1 | 12.2 | 0.0046 | 0.0466 | 2652 |
|  | No. 2 | 8.5 | 0.0045 | 0.0308 | 1889 |
|  | No. 3 | 10.4 | 0.0062 | 0.0878 | 1677 |

In Examples 6, 7, 8 and 9, no local deterioration in surface state was found in the etching test.

What is claimed is:

1. A corrosion resistant member having a portion to be exposed to a corrosive gas,
    wherein the portion to be exposed to the corrosive gas is formed of a ceramic sintered body, and
    the ceramic sintered body has a surface having a mean width (Rsm) of profile elements of 25 μm or less, and the ratio (Rsm/Ra) of the mean width (Rsm) of the profile elements to an arithmetic mean roughness (Ra) of the surface of the ceramic sintered body is 4.00 or less.

2. The corrosion resistant member according to claim 1, wherein the surface of the ceramic sintered body has an arithmetic mean roughness (Ra) of 0.02 μm or less.

3. The corrosion resistant member according to claim 1, wherein the surface of the ceramic sintered body has a maximum height (Rz) of 0.2 μm or less.

4. The corrosion resistant member according to claim 1, wherein the ceramic sintered body contains, as a predominant component, at least one species selected from alumina, yttria, and yttrium aluminum garnet.

5. The corrosion resistant member according to claim 1, wherein the portion to be exposed to the corrosive gas is at least a part of a gas nozzle, the part forming a nozzle hole of the gas nozzle.

6. The corrosion resistant member according to claim 1, wherein the mean width (Rsm) of the profile elements is 5 μm or more, and the ratio (Rsm/Ra) is 250 or more.

* * * * *

UNITED STATES PATENT AND TRADEMARK OFFICE
CERTIFICATE OF CORRECTION

PATENT NO. : 11,008,260 B2
APPLICATION NO. : 16/829946
DATED : May 18, 2021
INVENTOR(S) : Keisuke Sato and Tomoyuki Asano Page 1 of 1

It is certified that error appears in the above-identified patent and that said Letters Patent is hereby corrected as shown below:

In the Claims

Claim 1, Column 8, Line 33, replace "4.00" with "4,000"

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*